(12) United States Patent
Hosaka

(10) Patent No.: US 10,377,151 B2
(45) Date of Patent: Aug. 13, 2019

(54) IMAGE FORMING METHOD, IMAGE FORMING APPARATUS, AND LAMINATED CURED PRODUCT

(71) Applicant: Shigetoshi Hosaka, Kanagawa (JP)

(72) Inventor: Shigetoshi Hosaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 181 days.

(21) Appl. No.: 15/412,466

(22) Filed: Jan. 23, 2017

(65) Prior Publication Data

US 2017/0210144 A1    Jul. 27, 2017

(30) Foreign Application Priority Data

Jan. 26, 2016    (JP) .................................. 2016-012741

(51) Int. Cl.
| | | |
|---|---|---|
| *B41M 7/00* | (2006.01) | |
| *B41J 11/00* | (2006.01) | |
| *C09D 11/101* | (2014.01) | |
| *C09D 11/30* | (2014.01) | |

(52) U.S. Cl.
CPC ........... *B41J 11/002* (2013.01); *C09D 11/101* (2013.01); *C09D 11/30* (2013.01); *B41M 7/0081* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| 4,688,156 A * | 8/1987 | Suzuki .................... F21V 11/14 |
|---|---|---|
| | | 362/23.18 |
| 2009/0155484 A1 * | 6/2009 | Nakamura ............. C09D 11/30 |
| | | 427/511 |

(Continued)

FOREIGN PATENT DOCUMENTS

| JP | 2007-210169 | 8/2007 |
|---|---|---|
| JP | 2011-161824 | 8/2011 |

(Continued)

OTHER PUBLICATIONS

U.S. Appl. No. 15/202,858, filed Jul. 6, 2016.

*Primary Examiner* — Manish S Shah
(74) *Attorney, Agent, or Firm* — Oblon, McClelland, Maier & Neustadt, L.L.P.

(57) ABSTRACT

Provided is an image forming method including an image forming step of discharging liquid droplets of an active-energy-ray-curable ink onto a base to form a liquid-droplet film and irradiating the liquid-droplet film with an active energy ray to form a cured film, to form a laminated cured product in which the cured film is laminated on the base, wherein an elongation rate of the laminated cured product obtained according to a formula below is 60 percent or greater.

Elongation rate=[(length after tensile test−length before tensile test)/(length before tensile test)]× 100

Length before tensile test is a length of the laminated cured product obtained by laminating the cured film on the base to have an average thickness of 30 μm, and length after tensile test is a length of the laminated cured product after elongated with a tensile tester at a tensile speed of 20 mm/minute at 180 degrees C.

14 Claims, 7 Drawing Sheets

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218

See application file for complete search history.

(56) References Cited

U.S. PATENT DOCUMENTS

| | | | | |
|---|---|---|---|---|
| 2010/0053290 | A1* | 3/2010 | Nakamura | C09D 11/101 347/102 |
| 2011/0039117 | A1* | 2/2011 | Kadowaki | C08J 5/18 428/522 |
| 2014/0125744 | A1 | 5/2014 | Hiraoka | |
| 2014/0370214 | A1 | 12/2014 | Araki et al. | |
| 2015/0009265 | A1 | 1/2015 | Kohzuki et al. | |
| 2015/0042731 | A1 | 2/2015 | Hiraoka | |
| 2015/0077481 | A1 | 3/2015 | Yoshino et al. | |
| 2015/0130878 | A1 | 5/2015 | Kohzuki et al. | |
| 2015/0232675 | A1 | 8/2015 | Yoshino et al. | |
| 2016/0009931 | A1 | 1/2016 | Kohzuki et al. | |
| 2016/0075895 | A1 | 3/2016 | Kohzuki et al. | |
| 2016/0326387 | A1 | 11/2016 | Arita et al. | |
| 2016/0347961 | A1 | 12/2016 | Kobayashi et al. | |

FOREIGN PATENT DOCUMENTS

| | | |
|---|---|---|
| JP | 2012-255137 | 12/2012 |
| JP | 2013-022932 | 2/2013 |
| JP | 2013-181114 | 9/2013 |
| JP | 2013-237198 | 11/2013 |
| JP | 2014-240153 | 12/2014 |
| JP | 2015-131420 | 7/2015 |

* cited by examiner

IMAGE FORMING METHOD, IMAGE FORMING APPARATUS, AND LAMINATED CURED PRODUCT

CROSS-REFERENCE TO RELATED APPLICATIONS

The present application claims priority under 35 U.S.C. § 119 to Japanese Patent Application No. 2016-012741, filed Jan. 26, 2016. The contents of which are incorporated herein by reference in their entirety.

BACKGROUND OF THE INVENTION

Field of the Invention

The present disclosure relates to an image forming method, an image forming apparatus, and a laminated cured product.

Description of the Related Art

When forming cured films of active-energy-ray-curable inks by active energy ray irradiation, there is a method of discharging liquid droplets of the active-energy-ray-curable inks onto bases from ink discharging heads and forming images.

Various materials are suitable as the bases, including paper, metals, plastic, and glass. In terms of elongability and workability, plastic bases are preferable.

Examples of the method for forming images having a high density and clear colors on the plastic bases include a method of making cured films to be formed on the bases thick, and a method of forming cured films of white inks on the bases and forming cured films of color inks on the white ink films.

However, when a high-density image that realizes clear colors with a cured film made thick on the plastic base is to be used in an elongated form, the cured film becomes thinner as the cured film is elongated more because the elongated cured film deforms without volume change. This lowers the density and spoils the clear colors.

Hence, in order to realize a high density even after elongation, there is a need for forming a cured film on the base before elongated in a manner that the cured film has a large thickness, so the cured film may be kept thick even after elongated. However, as plotted in FIG. 1, a thicker cured film has a poorer elongability.

Accordingly, there is a problem that elongability and density or elongability and hardness are in a trade-off relationship.

In order to overcome this problem, there is proposed a printing method (see, e.g., Japanese Unexamined Patent Application Publication No. 2007-210169) including: a step of discharging an ink curable by light irradiation onto a recording medium from an inkjet head to form an ink layer in which adjacent portions of dots overlap; and a step of curing the ink layer, wherein the step of forming the ink layer on the recording medium includes at least first discharging of forming a first dot pattern, light irradiation to the first dot pattern, and second discharging of forming a second dot pattern, wherein the first dot pattern is an aggregate of ink dots arranged at intervals, and wherein the second dot pattern occupies at least part of the intervals in the first dot pattern.

There is also proposed a printing method (see, e.g., Japanese Unexamined Patent Application Publication No. 2013-022932) of delivering a first ink containing a first polymerization initiator and a first polymerizable compound and a second ink containing a second polymerization initiator and a second polymerizable compound onto a print medium in the form of liquid droplets and then curing the liquid droplets to apply printing on the print medium, wherein the first ink has a characteristic that a film obtained by curing the first ink to have a thickness of 5 μm elongates by 70 percent or greater when elongated in an environment of 150 degrees C., wherein the second ink has a characteristic that a glass transition temperature of a cured product obtained by curing the second ink is higher than a glass transition temperature of a cured product obtained by curing the first ink, and wherein delivering the first ink and the second ink onto the print medium is performed by delivering the liquid droplets of the first ink and the second ink in a manner that a first dot formed by a liquid droplet of the first ink landing on the print medium contacts a plurality of second dots formed by a plurality of liquid droplets of the second ink landing on the print medium, but adjacent ones of the second dots are spaced from each other.

SUMMARY OF THE INVENTION

According to one aspect of the present disclosure, an image forming method is an image forming method including an image forming step of discharging liquid droplets of an active-energy-ray-curable ink onto a base to form a liquid-droplet film and irradiating the liquid-droplet film with an active energy ray to form a cured film, to form a laminated cured product in which the cured film is laminated on the base.

An elongation rate of the laminated cured product obtained according to a formula described below is 60 percent or greater.

Elongation rate=[(length after tensile test−length before tensile test)/(length before tensile test)]× 100

The length before tensile test is the length of the laminated cured product obtained by laminating a cured film on the base to have an average thickness of 30 μm.

The length after tensile test is the length of the laminated cured product after elongated with a tensile tester at a tensile speed of 20 mm/minute at a temperature of 180 degrees C.

Figure 1:
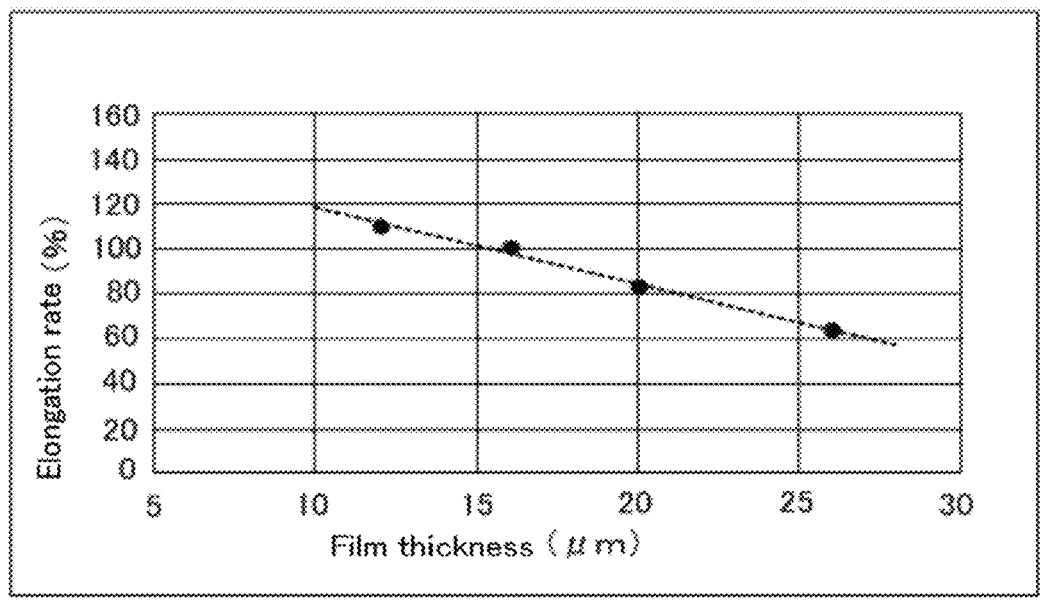
FIG. 1 is a graph plotting a typical relationship between film thickness and elongability when an active-energy-ray-curable ink is used.

DESCRIPTION OF THE EMBODIMENTS (Image Forming Method and Image Forming Apparatus)

An image forming method of the present disclosure is an image forming method including an image forming step of discharging liquid droplets of an active-energy-ray-curable ink onto a base to form a liquid-droplet film and irradiating the liquid-droplet film with an active energy ray to form a cured film, to form a laminated cured product in which the cured film is laminated on the base.

An elongation rate of the laminated cured product obtained according to a formula described below is 60 percent or greater.

Elongation rate=[(length after tensile test−length before tensile test)/(length before tensile test)]× 100

The length before tensile test is the length of the laminated cured product obtained by laminating a cured film on the base to have an average thickness of 30 μm.

The length after tensile test is the length of the laminated cured product after elongated with a tensile tester at a tensile speed of 20 mm/minute at a temperature of 180 degrees C.

The image forming step includes:

a first discharging process of discharging liquid droplets of the active-energy-ray-curable ink onto the base solidly to form a solid liquid-droplet film;

a first irradiating process of irradiating the solid liquid-droplet film with an active energy ray to form a solid cured film;

a second discharging process of discharging liquid droplets of the active-energy-ray-curable ink onto the solid cured film in a dot pattern to form liquid-droplet films in the dot pattern; and a second irradiating process of irradiating the liquid-droplet films in the dot pattern with an active energy ray to form the dot pattern.

The image forming step further includes other processes as needed.

An image forming apparatus of the present disclosure is an image forming apparatus including an image forming unit configured to discharge liquid droplets of an active-energy-ray-curable ink onto a base to form a liquid-droplet film and irradiate the liquid-droplet film with an active energy ray to form a cured film, to form a laminated cured product in which the cured film is laminated on the base.

An elongation rate of the laminated cured product obtained according to a formula described below is 60 percent or greater.

Elongation rate=[(length after tensile test−length before tensile test)/(length before tensile test)]× 100

The length before tensile test is the length of the laminated cured product obtained by laminating a cured film on the base to have an average thickness of 30 μm.

The length after tensile test is the length of the laminated cured product after elongated with a tensile tester at a tensile speed of 20 mm/minute at a temperature of 180 degrees C.

The image forming unit includes:

a first discharging member configured to discharge liquid droplets of the active-energy-ray-curable ink onto the base solidly to form a solid liquid-droplet film;

a first irradiating member configured to irradiate the solid liquid-droplet film with an active energy ray to form a solid cured film;

a second discharging member configured to discharge liquid droplets of the active-energy-ray-curable ink onto the solid cured film in a dot pattern to form liquid-droplet films in the dot pattern; and a second irradiating member configured to irradiate the liquid-droplet films in the dot pattern with an active energy ray to form the dot pattern.

The image forming unit further includes other units as needed.

The image forming method and image forming apparatus of the present disclosure are based on the following finding. According to the technique of Japanese Unexamined Patent Application Publication No. 2007-210169, making a film thickness large in order to make the density of cured films high with a view to forming the films into a solid image as a final state results in elongability loss. Furthermore, formation of one layer through two steps divisionally reduces productivity for forming one layer by half.

The image forming method and image forming apparatus of the present disclosure are also based on the following finding. According to the technique of Japanese Unexamined Patent Application Publication No. 2013-022932, the arrangement in which adjacent second dots are spaced from each other leads to density degradation upon elongation.

The present disclosure has an object to provide an image forming method of forming a laminated cured product in which a cured film is laminated on a base, while providing the laminated cured product with both of a high elongability and a high density after elongation.

The present disclosure can provide an image forming method of forming a laminated cured product in which a cured film is laminated on a base, while providing the laminated cured product with both of a high elongability and a high density after elongation.

The elongation rate of the laminated cured product calculated according to a formula described below is 60 percent or greater and preferably 100 percent or greater.

When the elongation rate of the laminated cured product is 60 percent or greater, a cured film laminated with a large thickness on a base can maintain a high elongability.

Elongation rate=[(length after tensile test−length before tensile test)/(length before tensile test)]× 100

The length before tensile test is the length of the laminated cured product obtained by laminating a cured film on the base to have an average thickness of 30 μm.

Curing is performed by irradiation of a wavelength corresponding to a UV-A region (a wavelength of 350 nm or longer but 400 nm or shorter) with a cumulative light volume of 1,000 mJ/cm$^2$.

The length after tensile test is the length of the laminated cured product after elongated with a tensile tester at a tensile speed of 20 mm/minute at a temperature of 180 degrees C.

An extensible plastic base is preferable as the base. Examples of the extensible plastic base include polycarbonate film (product name: IUPILON 100FE2000 available from Mitsubishi Engineering-Plastics Corporation, with an average thickness of 100 μm) and polycarbonate film (PANLITE PC-1151 available from Teijin Limited, with an average thickness of 0.5 mm).

(A/B)×100, which is an area ratio of an area A of the dot pattern to an area B of the cured film, is preferably 70 percent or greater, more preferably 90 percent or greater, and yet more preferably 90 percent or greater but 95 percent or less.

When the area ratio is 70 percent or greater, both of a high elongability and a high density after elongation can be satisfied.

First Embodiment

In the first embodiment, the image forming method and image forming apparatus of the present disclosure include an image forming step of discharging liquid droplets of an active-energy-ray-curable ink onto a base to form a liquid-droplet film and irradiating the liquid-droplet film with an active energy ray to form a cured film, to form a laminated cured product in which the cured film is laminated on the base.

The image forming step includes:

a first discharging process of discharging liquid droplets of the active-energy-ray-curable ink onto the base solidly to form a solid liquid-droplet film;

a first irradiating process of irradiating the solid liquid-droplet film with an active energy ray to form a solid cured film;

a second discharging process of discharging liquid droplets of the active-energy-ray-curable ink onto the solid cured film in a dot pattern to form liquid-droplet films in the dot pattern; and a second irradiating process of irradiating the liquid-droplet films in the dot pattern with an active energy ray to form the dot pattern.

The image forming step further includes other processes as needed.

First, as a first layer on the base, a solid liquid-droplet film filled with liquid droplets of the active-energy-ray-curable ink with no gaps is formed and irradiated with an active energy ray such as an ultraviolet ray, to form a solid cured film as the first layer.

Next, for forming a laminated cured product, lamination of a cured film on the first layer, intended for making the laminated portion of the laminated cured product thick, is performed by formation of a dot pattern, instead of solid coating on the solid cured film, which is the first layer.

It is preferable that patterns in the dot pattern be arranged independently from each other. With such a dot pattern, a laminated cured product in which predetermined gaps are opened can be formed. Therefore, even a laminated cured product including a cured film with a large film thickness in order to achieve a high density can be elongated without elongability loss.

The dot pattern is preferably repetition of fixed patterns.

Examples of a fixed pattern include a circular pattern and a polygonal pattern.

Examples of the circular pattern includes a perfect circle and an ellipse.

The polygonal pattern allows a fixed width to be set as the gap between the fixed patterns. This makes it possible to make the gap between the patterns narrow and increase the area to be occupied by laminated cured films, making the thin regions of the cured film less noticeable, to realize a higher density than when the fixed pattern is the circular pattern.

The polygonal pattern is not particularly limited so long as the polygonal pattern can fill the surface of the cured film. Examples of the polygonal pattern include a triangle, a tetragon, a pentagon, a hexagon, a heptagon, and an octagon. With the polygonal pattern, it is possible for elongability to be provided in a direction of an angle of a line linking the centers of the independent patterns. Hence, for selection of a polygonal pattern, it is possible to select a suitable polygonal pattern matching the direction of elongation.

FIGS. 2A to 2C and FIG. 3 illustrate a case where the fixed patterns for laminated regions are circular patterns. The regions expressed with a dense color in the drawings represent the laminated fixed patterns, and the regions expressed with a pale color in the drawings represent the regions where there is only the cured film of the first layer.

Figure 2A:
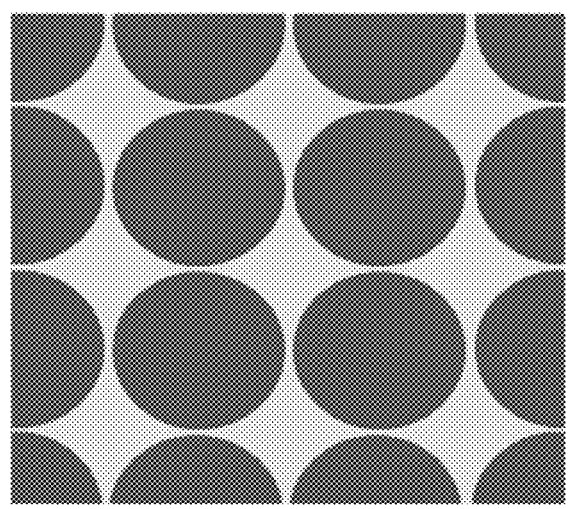
FIG. 2A is a diagram illustrating a formation in which circles are combined in a manner that lines linking the centers of the circles cross at a right angle, as an example of a dot pattern of the present disclosure.

When circular patterns are arranged in a manner that lines linking the centers of the circles cross at a right angle as illustrated in FIG. 2A, what is elongated by elongation is the thin cured film present between the circular patterns, because the cured films each laminated to have the circular shape are independent from each other. Hence, the force is applied dispersedly to the laminated portion, to enable the cured film to be elongated without elongability loss.

Figure 2B:
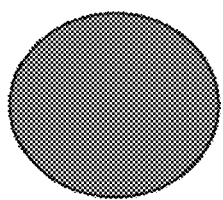
FIG. 2B is a diagram illustrating a single ink droplet forming one dot of a dot pattern.
Figure 2C:
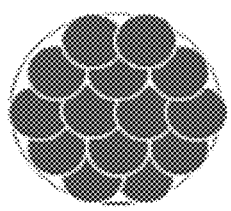
FIG. 2C is a diagram illustrating a plurality of ink droplets forming one dot of a dot pattern.

For constituting a circle with ink droplet, a circle may be a dot formed of a single ink droplet as illustrated in FIG. 2B, or a circle may be formed of a combination of a plurality of dots as illustrated in FIG. 2C. The number of dots used as the plurality of dots may be a number needed for making a circle, and is not limited to the number illustrated in FIG. 2C.

The density obtained when the circular patterns are used is slightly lower than the density obtained with a thick, solidly coated cured film, because the area of the regions with a smaller film thickness present between the circular patterns is large, to make the regions having a lower density noticeable.

Figure 3:
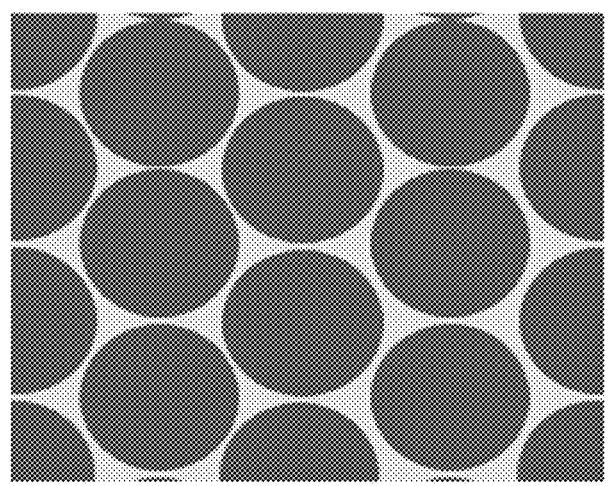
FIG. 3 is a diagram illustrating a pattern in which circles are combined in a manner that lines linking the centers of the circles cross at an angle of 120 degrees, as an example of a dot pattern of the present disclosure.

When circular patterns are arranged in a manner that lines linking the centers of the circles cross at an angle of 120 degrees as illustrated in FIG. 3, the laminated cured films can occupy a larger area, to make it possible to form a cured film having a density higher than the density in FIG. 2A. However, elongability of the cured film slightly degrades because the area of the thin regions of the cured film is reduced.

Figure 4A:
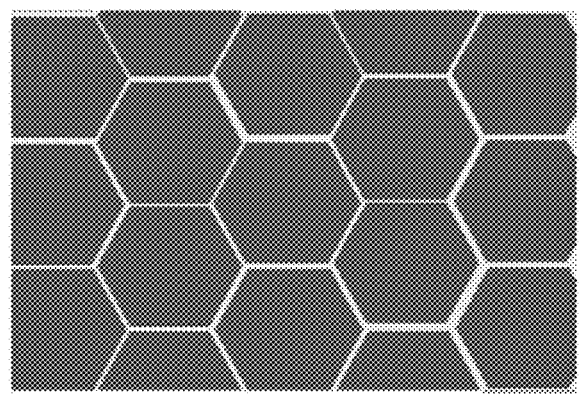
FIG. 4A is a diagram illustrating a formation in which hexagons are combined, as an example of a polygonal dot pattern of the present disclosure.
Figure 4B:
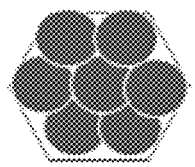
FIG. 4B is a diagram illustrating a plurality of ink droplets forming one dot of a hexagonal pattern.

FIGS. 4A and 4B illustrate a case where the fixed patterns for laminated regions are polygonal patterns, particularly, hexagonal patterns. The regions expressed with a dense color in the drawing represent the laminated fixed patterns, and the regions expressed with a pale color in the drawing represent the regions where there is only the cured film of the first layer.

Because the pattern is hexagonal as illustrated in FIG. 4A, the pattern can fill the surface of the cured film in a manner to leave gaps opened to have a predetermined width. Here, lines linking the centers of the independent patterns form an angle of 120 degrees.

The hexagonal shape is formed by combining a plurality of dots as illustrated in FIG. 4B. The number of dots used in the hexagonal shape formed of the plurality of dots may be a number needed for making a hexagonal shape, and is not limited to the number illustrated in FIG. 4B.

Second Embodiment

In the second embodiment, the image forming method and image forming apparatus of the present disclosure include an image forming step of discharging liquid droplets of an active-energy-ray-curable ink onto a base to form a liquid-droplet film and irradiating the liquid-droplet film with an active energy ray to form a cured film, to form a laminated cured product in which the cured film is laminated on the base.

The image forming step includes:

a first discharging process of discharging liquid droplets of the active-energy-ray-curable ink onto the base solidly to form a solid liquid-droplet film;

a first irradiating process of irradiating the solid liquid-droplet film with an active energy ray to form a solid cured film;

a second discharging process of discharging liquid droplets of the active-energy-ray-curable ink onto the solid cured film in a dot pattern to form liquid-droplet films in the dot pattern; and a second irradiating process of irradiating the liquid-droplet films in the dot pattern with an active energy ray to form the dot pattern.

The image forming step further includes other processes as needed.

First, as a first layer on the base, a solid liquid-droplet film filled with liquid droplets of the active-energy-ray-curable ink with no gaps is formed and irradiated with an active energy ray such as an ultraviolet ray, to form a solid cured film as the first layer.

Next, for forming a laminated cured product, lamination of a cured film on the first layer, intended for making the laminated portion of the laminated cured product thick, is performed by formation of a dot pattern, instead of solid coating on the solid cured film, which is the first layer.

It is preferable that the dot pattern be formed as repetition of straight line shapes arranged at regular intervals. With such a dot pattern, thick cured film regions having a high density and a thin solid cured film having a high elongability can be present at the same time.

Each of the straight line shapes has the straight line shape by dots being made continuous in one direction. In a direction orthogonal to that direction, dots are not continuous, so the straight line shapes are arranged independently from each other.

It is preferable that the distance (groove width) between adjoining straight line shapes be 5 μm or greater but 20 μm or less. When the groove width is 5 μm or greater but 20 μm or less, it is possible to adjust the area ratio of the laminated regions appropriately.

It is preferable that a direction in which straight line shapes are repeated be at an arbitrary angle.

It is preferable that the arbitrary angle satisfy conditions that make the film extensible only uniaxially and that the arbitrary angle be more preferably 0 degree or greater but 90 degrees or less.

When the direction in which the straight line shapes are repeated is parallel with the longer direction of the base, there is an advantage that the direction of elongation can be the same as the longer direction of the base.

When the direction in which the straight line shapes are repeated is parallel with the shorter direction of the base, there is an advantage that the direction of elongation can be the same as the shorter direction of the base.

FIGS. 6A to 6C, FIG. 7, and FIG. 8 illustrate cases where the laminated regions are formed in a dot pattern formed of repetition of straight line shapes. The regions expressed with a dense color in the drawings represent the dot pattern formed of the repetition of straight line shapes, and the regions expressed with a pale color in the drawings represent the regions where there is only the thin solid cured film of the first layer.

Figure 6A:
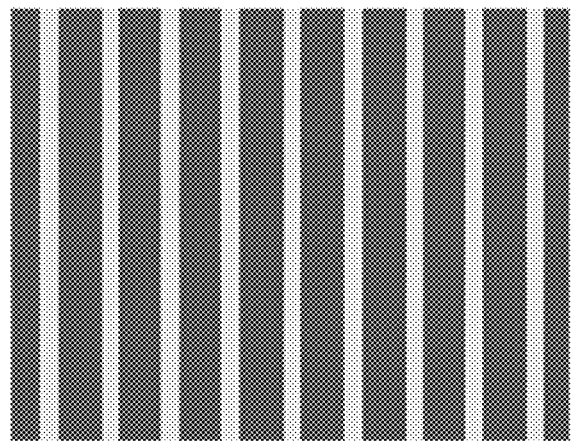
FIG. 6A is a diagram illustrating a pattern in which straight line shapes are repeated, as an example of a dot pattern of the present disclosure.

As illustrated in FIG. 6A, the thin solid cured film having a high elongability is orthogonal to the direction in which the laminated straight lines extend. Hence, when seen in the normal direction, the cured film alternately has thick regions and thin regions, as illustrated in FIG. 6B.

Figure 6B:
FIG. 6B is a side view of the cured film of FIG. 6A, seen along a direction parallel with the direction in which the laminated straight line shapes extend.
Figure 6C:
FIG. 6C is a side view of the cured film of FIG. 6A, seen along a direction orthogonal to the direction in which the laminated straight line shapes extend.

When the laminated regions are arranged as illustrated in FIGS. 6A to 6C, the high density at the laminated regions becomes the dominant density. Particularly, when the region in the gap (groove) between adjoining straight line shapes is sufficiently narrow, as high a density as when a thick solid cured film is formed can be realized.

When the cured film is elongated in a direction (left-right direction in FIG. 6B; X direction) orthogonal to the direction in which the laminated straight line shapes extend, the laminated cured product as a whole can be elongated sufficiently, because the thin cured film regions on which no lamination is formed are elongated.

On the other hand, when the cured film is elongated in the same direction (left-right direction in FIG. 6C; Y direction) as the direction in which the laminated straight line shapes extend, elongability is as poor as when a thick solid cured film is elongated, because the laminated cured films each having the straight line shape exist all along.

Figure 10:
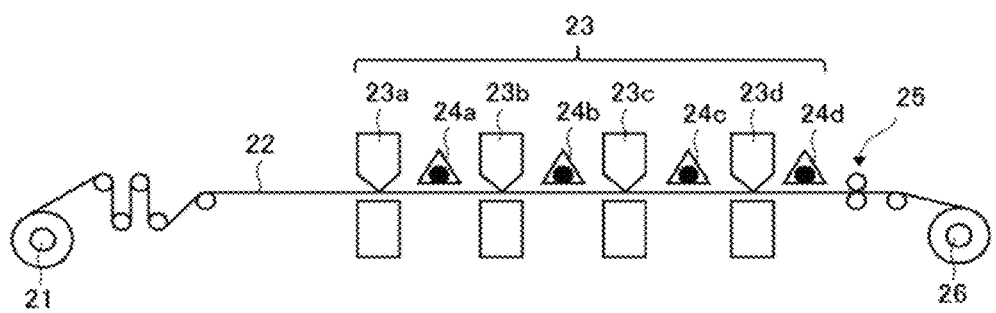
FIG. 10 is a schematic view illustrating an example of an image forming apparatus of the present disclosure.

An image forming apparatus using a roll-shaped base as illustrated in FIG. 10 can form a dot pattern formed of repetition of straight line shapes extending in a direction orthogonal to the direction in which the base is conveyed, by discharging the ink from all nozzles of an ink discharging head simultaneously.

On the other hand, formation of a dot pattern formed of repetition of straight line shapes extending in the same direction as the direction in which the base is conveyed can be realized simply by making certain nozzles discharge the ink continuously.

Also when a base cut into a fixed form is conveyed instead of a roll-shaped base, the dot pattern formed of repetition of straight line shapes can be formed in the same manner as used on the roll-shaped base.

Also when a base cut into a fixed form is completely immobilized so only the ink discharging head is moved, a dot pattern formed of repetition of straight line shapes can be formed by making the ink discharging head discharge the ink at the timings at which the ink discharging head is moved in the same direction as the direction in which the base would be conveyed when the base is moved.

In the example illustrated in FIGS. 6A to 6C, the direction in which the straight line shapes extend is the direction from the front to the rear of the base. However, the direction in which the straight line shapes extend may be an arbitrary direction depending on the printing method.

Figure 7:
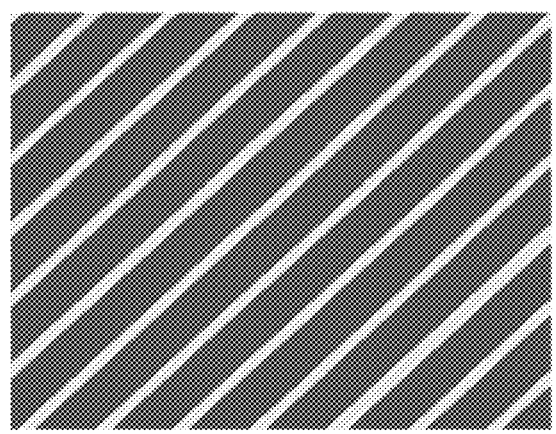
FIG. 7 is a diagram illustrating a formation obtained by rotating the straight line shapes of FIG. 6A by 45 degrees, as another example of a dot pattern of the present disclosure.

FIG. 7 is a diagram of a dot pattern formed of repetition of straight line shapes inclined by 45 degrees from the straight line shapes illustrated in FIG. 6A. The straight line shapes illustrated in FIG. 7 can be realized by controlling the timings at which the ink is discharged from the nozzles while the base or the ink discharging head is moved, in a manner that the timings are when the nozzles have come to the positions at which straight line shapes inclined by 45 degrees are desired to be formed.

Figure 8:
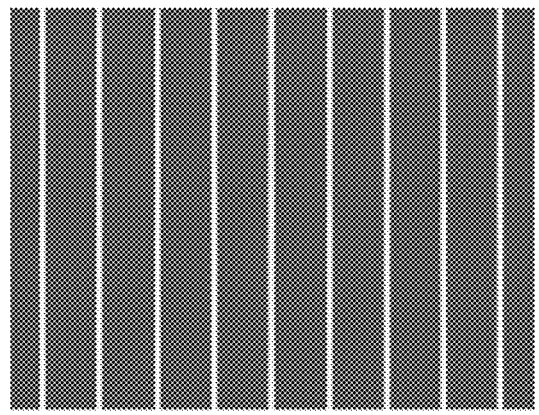
FIG. 8 is a diagram illustrating a pattern in which straight line shapes are repeated, as another example of a dot pattern of the present disclosure.

FIG. 8 is a diagram in which the distance (groove width) between adjoining straight line shapes is made shorter than between the straight line shapes illustrated in FIG. 6A to make the area ratio of the laminated regions greater. The area ratio of the laminated regions illustrated in FIG. 8 is 90 percent. On the other hand, the area ratio of the laminated regions illustrated in FIG. 6A is 70 percent.

[Active-Energy-Ray-Curable Ink]

It is preferable that the active-energy-ray-curable ink used in the first discharging process and the active-energy-ray-curable ink used in the second discharging process be two kinds of inks of which cured films are different in hardness.

It is preferable that a cured film of the active-energy-ray-curable ink used in the second discharging process be higher in hardness than a cured film of the active-energy-ray-curable ink used in the first discharging process.

The hardness of the cured film can be measured by measuring scratch hardness according to pencil method specified in JIS-K-5600-5-4.

<Active-Energy-Ray-Curable Ink Used in First Discharging Process>

The active-energy-ray-curable ink used in the first discharging process contains a polymerizable compound, and preferably further contains a polymerization initiator, a colorant, an organic solvent, and other components as needed.

—Polymerizable Compound—

The polymerizable compound is a compound that starts a polymerization reaction in response to an active energy ray and cures. In the present disclosure, the polymerizable compound contains a monofunctional monomer as a main component in order to improve elongability. For viscosity adjustment, it is preferable that the polymerizable compound contain a multifunctional monomer unless elongability is spoiled. Here, monomer refers to a polymerizable compound that has not undergo a polymerization reaction yet, and is not particularly limited in molecular weight.

—Monofunctional Monomer—

When the polymerizable compound contains a monofunctional monomer as a main component, a polymer chain of a polymerization product contains few networked structures and can achieve elongability.

The content of the monofunctional monomer is 85 percent by mass or greater of the total amount of the polymerizable compound.

The monofunctional monomer is preferably a monomer of which cured product has a high glass transition temperature (Tg). When a multifunctional monomer having a high glass transition temperature is blended in the ink, stiffness of a cured product at or below a glass transition temperature (Tg) is high. This enables suppression of permeability without degradation of elongability.

Examples of the monofunctional monomer include hydroxyethyl (meth)acrylamide, (meth)acryloylmorpholine, dimethylaminopropyl (meth)acrylamide, isobornyl (meth)acrylate, adamantyl (meth)acrylate, 2-methyl-2-adamantyl (meth)acrylate, dicylopentenyl (meth)acrylate, dicyclopentanyl (meth)acrylate, dicyclopentenyloxyethyl (meth)acrylate, 3,3,5-trimethyl cyclohexane(meth)acrylate, tetrahydrofurfuryl (meth)acrylate, cyclohexyl (meth)acrylate, benzyl (meth)acrylate, 2-hydroxyethyl (meth)acrylate, 2-hydroxypropyl (meth)acrylate, 2-hydroxybutyl (meth)acrylate, isobutyl (meth)acrylate, t-butyl (meth)acrylate, phenoxyethyl (meth)acrylate, (2-methyl-2-ethyl-1,3-dioxolan-4-yl) methyl (meth)acrylate, and cyclic trimethylolpropane formal (meth)acrylate. One of these monofunctional monomers may be used alone or two or more of these monofunctional monomers may be used in combination.

—Multifunctional Monomer—

The multifunctional monomer is preferably a bifunctional or greater but pentafunctional or less monomer and more preferably a bifunctional monomer.

Examples of the multifunctional monomer include urethane acrylate oligomers, epoxy acrylate oligomers, polyester acrylate oligomers, polyether acrylate oligomers, and silicone acrylate oligomers. One of these multifunctional monomers may be used alone or two or more of these multifunctional monomers may be used in combination. Among these multifunctional monomers, urethane acrylate oligomers are preferable.

The urethane acrylate oligomers may be commercially available products. Examples of the commercially available products include: UV-2000B, UV-2750B, UV-3000B, UV-3010B, UV-3200B, UV-3300B, UV-3700B, UV-6640B, UV-8630B, UV-7000B, UV-7610B, UV-1700B, UV-7630B, UV-6300B, UV-6640B, UV-7550B, UV-7600B, UV-7605B, UV-7610B, UV-7630B, UV-7640B, UV-7650B, UT-5449, and UT-5454 available from Nippon Synthetic Chemical Industry Co., Ltd.; CN929, CN961E75, CN961H81, CN962, CN963, CN963A80, CN963B80, CN963E75, CN963E80, CN963J85, CN965, CN965A80, CN966A80, CN966H90, CN966J75, CN968, CN981, CN981A75, CN981B88, CN982, CN982A75, CN982B88, CN982E75, CN983, CN985B88, CN9001, CN9002, CN9788, CN970A60, CN970E60, CN971, CN971A80, CN972, CN973A80, CN973H85, CN973J75, CN975, CN977C70, CN978, CN9782, CN9783, CN996, and CN9893 available from Tomoe Engineering Co., Ltd.; and EBECRYL210, EBECRYL220, EBECRYL230, EBECRYL270, KRM8200, EBECRYL5129, EBECRYL8210, EBECRYL8301, EBECRYL8804, EBECRYL8807, EBECRYL9260, KRM7735, KRM8296, KRM8452, EBECRYL4858, EBECRYL8402, EBECRYL9270, EBECRYL8311, and EBECRYL8701 available from Daicel-Cytec Company, Ltd. One of these commercially available products may be used alone or two or more of these commercially available products may be used in combination.

Details of the polymerization initiator, the colorant, and the organic solvent will be described below.

<Active-Energy-Ray-Curable Ink Used in Second Discharging Process>

The active-energy-ray-curable ink used in the second discharging process contains a polymerizable compound, is free of a diluent solvent, and preferably further contains a polymerization initiator, a colorant, and other components as needed.

It is preferable that the polymerizable compound contain diethylene glycol dimethacrylate and at least any one of caprolactone-modified dipentaerythritol hexaacrylate and ethylene oxide-modified trimethylolpropane trimethacrylate.

The content of the diethylene glycol dimethacrylate is preferably 10 percent by mass or greater but 95 percent by mass or less and more preferably 20 percent by mass or greater but 80 percent by mass or less of the total amount of the polymerizable compound.

The content of the at least any one of caprolactone-modified dipentaerythritol hexaacrylate and ethylene oxide-modified trimethylolpropane trimethacrylate is preferably 5 percent by mass or greater but 90 percent by mass or less and more preferably 20 percent by mass or greater but 80 percent by mass or less of the total amount of the polymerizable compound.

As needed, the active-energy-ray-curable ink used in the second discharging process may further contain the polymerizable compound used in the active-energy-ray-curable ink used in the first discharging process.

Details of the polymerization initiator and the colorant will be described below.

<Active Energy Rays>

Active energy rays used for curing the active-energy-ray-curable ink of the present disclosure are not particularly limited, so long as they are able to give necessary energy for allowing polymerization reaction of polymerizable components in the composition to proceed. Examples of the active energy rays include electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Polymerization Initiator>

The active-energy-ray-curable ink of the present disclosure optionally contains a polymerization initiator. The polymerization initiator produces active species such as a radical or a cation upon application of energy of an active energy ray and initiates polymerization of a polymerizable compound (monomer or oligomer). As the polymerization initiator, it is suitable to use a known radical polymerization initiator, cation polymerization initiator, base producing agent, or a combination thereof. Of these, a radical polymerization initiator is preferable. Moreover, the polymerization initiator preferably accounts for 5 percent by mass to 20 percent by mass of the total content of the ink (100 percent by mass) to obtain sufficient curing speed.

Specific examples of the radical polymerization initiators include, but are not limited to, aromatic ketones, acylphosphine oxide compounds, aromatic onium salt compounds, organic peroxides, thio compounds (thioxanthone compounds, thiophenyl group containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds.

In addition, a polymerization accelerator (sensitizer) is optionally used together with the polymerization initiator. The polymerization accelerator is not particularly limited. Preferred examples thereof include, but are not limited to, amines such as trimethylamine, methyl dimethanol amine, triethanol amine, p-diethylamino acetophenone, p-dimethyl amino ethylbenzoate, p-diethylamino benzoate-2-ethylhexyl, N,N-dimethyl benzylamine and 4,4'-bis(diethylamino)benzophenone. The content thereof is determined depending on the identity (type) of the polymerization initiator and the content thereof.

<Colorant>

The active-energy-ray-curable ink of the present disclosure may contain a colorant. As the colorant, various pigments and dyes may be used that impart black, white, magenta, cyan, yellow, green, orange, and gloss colors such as gold and silver, depending on the intended purpose of the composition and requisite properties thereof in the present disclosure. A content of the colorant in the composition is not particularly limited, and may be appropriately determined considering, for example, a desired color density and dispersibility of the colorant in the ink. However, it is preferably from 0.1 percent by mass to 20 percent by mass relative to the total mass (100 percent by mass) of the ink. Incidentally, the active-energy-ray-curable ink of the present disclosure does not necessarily contain a colorant but can be clear and colorless. In such a case, for example, such a clear and colorless ink is good for an overcoating layer to protect an image.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinophthalone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment.

The dispersant has no particular limit and can be, for example, dispersants such as polymer dispersants conventionally used to prepare pigment dispersion.

The dyes include, for example, acidic dyes, direct dyes, reactive dyes, basic dyes, and combinations thereof.

<Organic Solvent>

The active-energy-ray-curable ink of the present disclosure optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Other Components>

The active-energy-ray-curable ink of the present disclosure optionally contains other known components. The other known components are not particularly limited. Specific examples thereof include, but are not limited to, known articles such as surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

<Preparation of Active-Energy-Ray-Curable Ink>

The active-energy-ray-curable ink of the present disclosure can be prepared by using the components described above. The preparation devices and conditions are not particularly limited. For example, the curable-ink can be prepared by subjecting a polymerizable monomer, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization initiator, and a surfactant.

<Viscosity>

The viscosity of the active-energy-ray-curable ink of the present disclosure has no particular limit because it can be adjusted depending on the purpose and application devices. For example, if an ejecting device that ejects the ink from nozzles is employed, the viscosity thereof is preferably in the range of 3 mPa·s to 40 mPa·s, more preferably 5 mPa·s to 15 mPa·s, and particularly preferably 6 mPa·s to 12 mPa·s in the temperature range of 20 degrees C. to 65 degrees C., preferably at 25 degrees C. In addition, it is particularly preferable to satisfy this viscosity range by the ink free of the organic solvent described above. Incidentally, the viscosity can be measured by a cone plate rotary viscometer (VISCOMETER TVE-22L, manufactured by TOKI SANGYO CO., LTD.) using a cone rotor (1°34'×R24) at a number of rotation of 50 rpm with a setting of the temperature of hemathermal circulating water in the range of 20 degrees C. to 65 degrees C. VISCOMATE VM-150III can be used for the temperature adjustment of the circulating water.

<Application Field>

The application field of the active-energy-ray-curable ink of the present disclosure is not particularly limited. It can be applied to any field where active-energy-ray-curable compositions are used. For example, the curable composition is selected to a particular application and used for a resin for processing, a paint, an adhesive, an insulant, a releasing agent, a coating material, a sealing material, various resists, and various optical materials.

Figure 11:
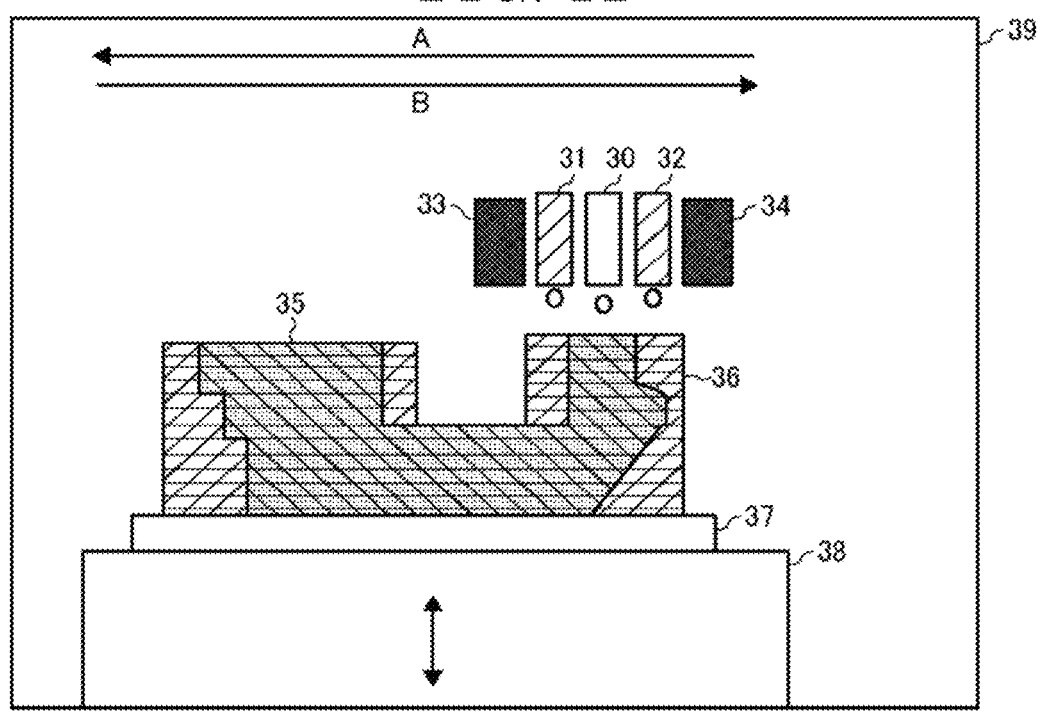
FIG. 11 is a schematic view illustrating another example of an image forming apparatus of the present disclosure.
Figure 12A:
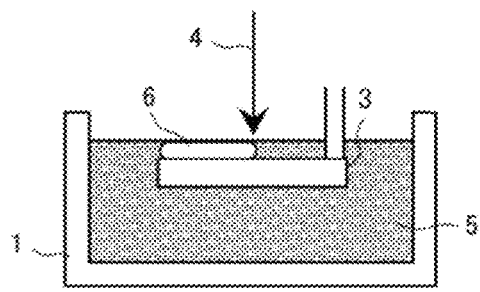
FIGS. 12A to 12D are schematic views illustrating a still another example of an image forming apparatus of the present disclosure.
Figure 12B:
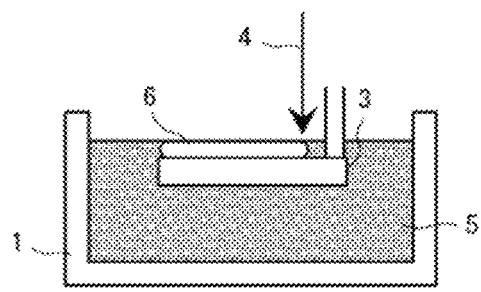
Figure 12C:
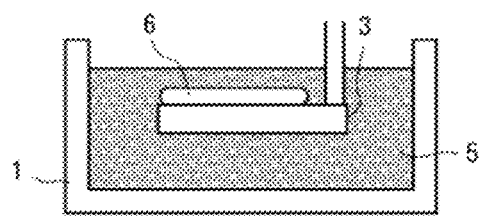
Figure 12D:
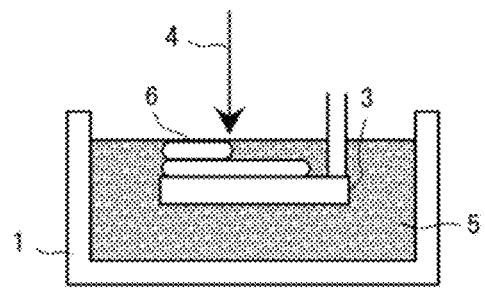

Furthermore, the active-energy-ray-curable ink of the present disclosure can be used as an ink to form two-dimensional texts, images, and designed coating film on various substrates and in addition as a solid object forming material to form a three-dimensional object. This three dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 11 and FIGS. 12A to 12D. FIG. 11 is a diagram illustrating a method of additive manufacturing to sequentially form layers of the active-energy-ray-curable ink of the present disclosure one on top of the other by repeating discharging the curable ink to particular areas followed by curing upon irradiation of an active energy ray (detailed below). FIGS. 12A to 12D are each a diagram illustrating a method of additive manufacturing to sequentially form cured layers 6 having respective predetermined forms one on top of the other on a movable stage 3 by irradiating a storing pool (storing part) 1 of the active energy ray curable ink 5 of the present disclosure with the active energy ray 4.

An apparatus for fabricating a three-dimensional object by the active-energy-ray-curable ink of the present disclosure is not particularly limited and can be a known apparatus. For example, the apparatus includes a containing device, a supplying device, and a discharging device of the curable composition, and an active energy ray irradiator.

In addition, the present disclosure includes cured materials obtained by curing the active-energy-ray-curable ink and processed products obtained by processing structures having the cured materials on a substrate. The processed product is fabricated by, for example, heat-drawing and punching a cured material or structure having a sheet-like form or film-like form. The processed product is suitable for what is processed after surface-decorating. Examples thereof are gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

<Stored Container>

The stored container of the present disclosure contains the active-energy-ray-curable ink and is suitable for the applications as described above. For example, if the active-energy-ray-curable ink of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container is not particularly limited and can be of any size, any form, and any material. For example, the container can be designed to a particular application. It is preferable to use a light blocking material to block the light or cover a container with a light blocking sheet, etc.

<Image Forming Method and Image Forming Apparatus>

The image forming method of the present disclosure includes at least an irradiating step of irradiating the active-energy-ray-curable ink of the present disclosure with an active energy ray to cure the curable ink. The image forming apparatus of the present disclosure includes at least an irradiator to irradiate the curable ink of the present disclosure with an active energy ray and a storing part containing the active-energy-ray-curable ink of the present disclosure. The storing part may include the container mentioned above. Furthermore, the method and the apparatus may respectively include a discharging step and a discharging device to discharge the active energy ray curable ink. The method of discharging the curable ink is not particularly limited, and examples thereof include a continuous jetting method and an on-demand method. The on-demand method includes a piezo method, a thermal method, an electrostatic method, etc.

FIG. 10 is a diagram illustrating an image forming apparatus equipped with an inkjet discharging device. Printing units 23a, 23b, 23c, and 23d respectively having ink cartridges and discharging heads for yellow, magenta, cyan, and black active-energy-ray-curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26.

Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, metal, or complex materials thereof. The recording medium 22 takes a sheet-like form but is not limited thereto. The image forming apparatus may have a one-side printing configuration and/or a two-side printing configuration.

Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink of the present disclosure includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 11 is a schematic diagram illustrating another example of the image forming apparatus (apparatus to fabricate a 3D object) of the present disclosure. An image forming apparatus 39 illustrated in FIG. 11 sequentially forms thin layers one on top of the other using a head unit having inkjet heads arranged movable in the directions indicated by the arrows A and B. In the image forming apparatus 39, an ejection head unit 30 for additive manufacturing ejects a first active-energy-ray-curable ink, and ejection head units 31 and 32 for support eject a second active-energy-ray-curable ink having a different composition from the first active-energy-ray-curable ink, while ultraviolet irradiators 33 and 34 adjacent to the ejection head units 31 and 32 cure the compositions. To be more specific, for example, after the ejection head units 31 and 32 for support eject the second active-energy-ray-curable ink onto a substrate 37 for additive manufacturing and the second active-energy-ray-curable ink is solidified by irradiation of an active energy ray to form a first substrate layer having a pool, the ejection head unit 30 for additive manufacturing ejects the first active-energy-ray-curable ink onto the pool followed by irradiation of an active energy ray for solidification, thereby forming a first additive manufacturing layer. This step is repeated multiple times while lowering the stage 38 movable in the vertical direction in a manner to match how many layers are laminated, to laminate the supporting layer and the additive manufacturing layer to fabricate a solid object 35. Thereafter, an additive manufacturing support 36 is removed, if desired. Although only a single ejection head unit 30 for additive manufacturing is provided to the image forming apparatus 39 illustrated in FIG. 11, it can have two or more units 30.

EXAMPLES

The present disclosure will be described in detail by way of Examples. The present disclosure should not be construed as being limited to these Examples.

<Preparation of Active-Energy-Ray-Curable Ink for First Layer>

The composition prescribed below was mixed, to prepare an active-energy-ray-curable ink for a first layer.

[Composition]
  Cyclic trimethylolpropane formal acrylate: 50.0 parts by mass
  N-vinylcaprolactam: 15.0 parts by mass
  Polymerization initiator (IRGACURE 819 available from BASF AG): 4.0 parts by mass
  Polymerization initiator (IRGACURE 184 available from BASF AG): 3.0 parts by mass
  Polymerization initiator (SPEEDCURE ITX available from Lambson Limited): 1.0 part by mass
  Acrylic resin (ELVACITE 2013 available from Lucite International Group): 1.8 parts by mass
  Phenoxyethyl acrylate: 17.1 parts by mass <Preparation of Active-Energy-Ray-Curable Ink for Second Layer>

The composition prescribed below was mixed, to prepare an active-energy-ray-curable ink for a second layer.

[Composition]
  Diethylene glycol dimethacrylate, available from Shin-Nakamura Chemical Co., Ltd., "2G": 70 parts by mass
  Caprolactone-modified dipentaerythritol hexaacrylate, available from Nippon Kayaku Co., Ltd., "DPCA60": 30 parts by mass
  Carbon black (blending amount is indicated as a blending amount of a mixture of CARBON BLACK #10 available from Mitsubishi Chemical Corporation and a polymer dispersant SOLSPERSE 39000 available from Lubrizol Corporation at a mass ratio of 3:1): 2 parts by mass
  Polymerization initiator (IRGACURE 184 available from BASF AG): 15 parts by mass Subsequently, the viscosity and hardness of the active-energy-ray-curable inks for a first layer and a second layer were measured in the manners described below.

<Viscosity>

The viscosity of each active-energy-ray-curable ink produced was measured by a cone plate rotary viscometer VISCOMETER TVE-22L manufactured by TOKI SANGYO CO., LTD. with the temperature of hemathermal circulating water set to 25 degrees C. VISCOMATE VM-150III (manufactured by TOKI SANGYO CO., LTD.) was used for the temperature adjustment.

The viscosity of the active-energy-ray-curable ink for a first layer at 25 degrees C. was 25 mPa·s. The viscosity of the active-energy-ray-curable ink for a second layer at 25 degrees C. was 30 mPa·s.

<Hardness>

The hardness was evaluated based on scratch hardness according to pencil method specified in JIS-K-5600-5-4. The instrument used was product name: KT-VF2378-12 available from COTEC Corporation.

The hardness of a cured film of the active-energy-ray-curable ink for a first layer was B. The hardness of a cured film of the active-energy-ray-curable ink for a second layer was HB.

Comparative Example 1

<Production of Cured Product>

With an inkjet discharging apparatus mounted with a GEN 4 head (available from Ricoh Printing Systems, Inc.), a solid liquid-droplet film formed of the active-energy-ray-curable ink for a first layer and having an average thickness of 12 μm was formed on a base, which was a polycarbonate film (product name: IUPILON 100FE2000 available from Mitsubishi Engineering-Plastics Corporation, with an average thickness of 100 μm). Using a UV irradiator LH6 available from Fusion Systems Japan Co., Ltd., the solid liquid-droplet film was cured by irradiation with an active energy ray having a wavelength corresponding to a UV-A region (a wavelength of 350 nm or longer but 400 nm or shorter) with a cumulative light volume of 1,000 mJ/cm$^2$, to form a solid cured film (first layer).

Subsequently, a solid liquid-droplet film formed of the active-energy-ray-curable ink for a second layer and having an average thickness of 18 μm was formed on the first layer. Using a UV irradiator LH6 available from Fusion Systems Japan Co., Ltd., the solid liquid-droplet film was cured by irradiation with an active energy ray having a wavelength corresponding to a UV-A region (a wavelength of 350 nm or longer but 400 nm or shorter) with a cumulative light volume of 1,000 mJ/cm$^2$, to form a solid cured film (second layer). In the way described above, a laminated cured product including a laminated portion having an average thickness of 30 μm was produced on the base.

Comparative Example 2

A single-layer cured product including a first layer having an average thickness of 12 μm on a base was produced in the same manner as in Comparative Example 1, except that no second layer was formed on the first layer unlike in Comparative Example 1.

Example 1

A laminated cured product including a laminated portion having an average thickness of 30 μm on a base was produced in the same manner as in Comparative Example 1, except that second layers (laminated regions) formed of a dot pattern illustrated in FIG. 3 were formed on the first layer using the active-energy-ray-curable ink for a second layer.

Example 2

A laminated cured product including a laminated portion having an average thickness of 30 μm on a base was produced in the same manner as in Comparative Example 1, except that second layers (laminated regions) formed of a hexagonal dot pattern illustrated in FIGS. 4A and 4B were formed on the first layer using the active-energy-ray-curable ink for a second layer.

Next, elongability, density, and area ratio of laminated regions of the cured products of Examples 1 and 2 and Comparative Examples 1 and 2 were measured in the manners described below. The results are presented in Table 1.

<Elongability>

The length of each cured product produced was measured before and after the cured product was elongated with a tensile tester (AUTOGRAPH AGS-5KNX available from Shimadzu Corporation) under conditions that the tensile speed was 20 mm/minute, the temperature was 180 degrees C., and the sample was a dumbbell shape (No. 6) specified in JIS K6251. An elongation rate was calculated according to [(length after tensile test−length before tensile test)/(length before tensile test)]×100 to evaluate elongability according to the criterial described below. The grades of B or higher are tolerable levels.

[Evaluation Criteria]

A: The elongation rate was 100 percent or greater.
B: The elongation rate was 60 percent or greater but less than 100 percent.
C: The elongation rate was less than 60 percent.

<Density>

The density of a cured product produced in the same manner as producing the sample for evaluation of the elongability was measured with X-RITE 939 (available from X-Rite Inc.) after the cured product was elongated. The density was evaluated according to the criteria described below. The grades of B or higher are tolerable levels.

[Evaluation Criteria]

A: The density was 100 percent or greater, when the density of Comparative Example 1 was seen as a basis.
B: The density was 60 percent or greater but less than 100 percent, when the density of Comparative Example 1 was seen as a basis.
C: The density was less than 60 percent, when the density of Comparative Example 1 was seen as a basis.

<Area Ratio of Laminated Regions>

(A/B)×100, which was an area ratio of the area A of the laminated regions (second layers) to the area B of the first layer, was calculated. The area A and the area B were obtained based on area scale in print image data.

TABLE 1

|  | Ex. 1 | Ex. 2 | Comp. Ex. 1 | Comp. Ex. 2 |
| --- | --- | --- | --- | --- |
| Form of laminated region | Circular | Hexagonal | Solid film | Single layer |
| Elongability | A | B | C | A |
| Density | B | A | A | C |
| Area ratio of laminated regions | 80 percent | 90 percent | 100 percent | 0 percent |

<Relationship between Film Thickness and Elongability>

Next, elongation rates of laminated cured products obtained by varying the average thickness of the laminated portion of Examples 1 and 2 and Comparative Example 1 while fixing the average thickness of the first layer to 12 μm were measured. The results are presented in FIG. 5.

Figure 5:
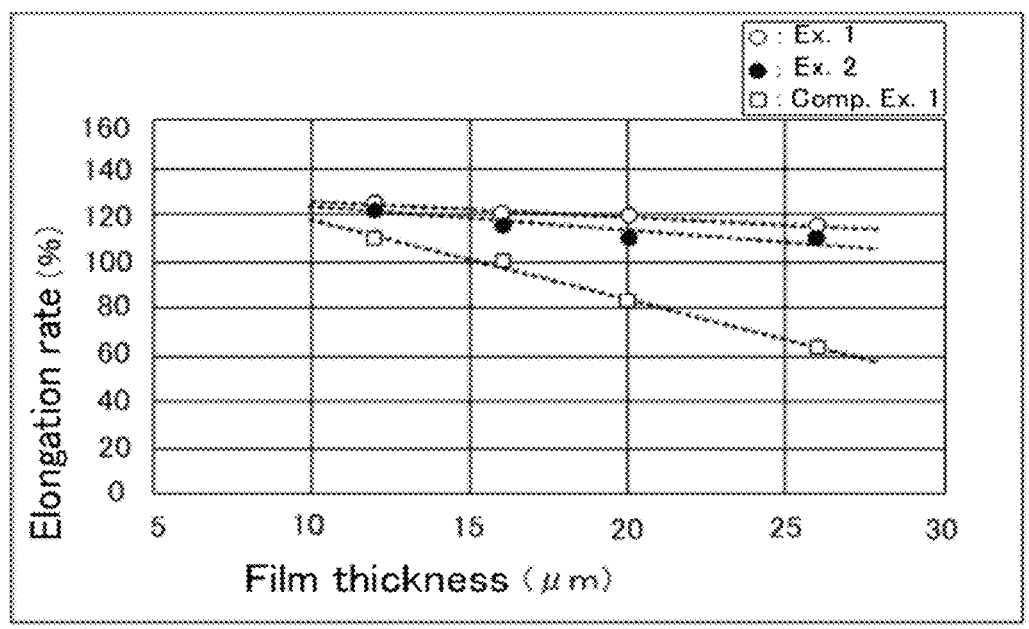
FIG. 5 is a graph plotting a relationship between film thickness and elongability of a cured product.

From the results of FIG. 5, it was revealed that the cured film of Example 1 with a circular dot pattern maintained substantially the same elongation rate as when the film thickness was small (12 μm), and that the elongation rate of Example 2 with a hexagonal dot pattern was less than the elongation rate of Example 1 but greater than the elongation rate of Comparative Example 1.

Example 3

A laminated cured product including a laminated portion having an average thickness of 30 μm on a base was produced in the same manner as in Comparative Example 1, except that laminated regions formed of repetition of straight line shapes illustrated in FIGS. 6A to 6C were formed on the first layer using the active-energy-ray-curable ink for a second layer.

Example 4

A laminated cured product including a laminated portion having an average thickness of 30 μm on a base was produced in the same manner as in Comparative Example 1, except that second layers formed of repetition of straight line shapes illustrated in FIG. 8 were formed on the first layer as laminated regions using the active-energy-ray-curable ink for a second layer.

Example 5

A laminated cured product including a laminated portion having an average thickness of 30 μm on a base was produced in the same manner as in Comparative Example 1, except that second layers formed of repetition of shapes illustrated in FIG. 7 obtained by rotating the straight line shapes illustrated in FIG. 6A by 45 degrees were formed on the first layer using the active-energy-ray-curable ink for a second layer.

Next, elongability (in X direction), density, and area ratio of the cured products of Examples 3 to 5 and Comparative Examples 1 and 2 were measured in the same manners as in Examples 1 and 2. The elongability (in X direction) is elongability in the left-right direction in FIG. 6B, and elongability in Y direction is elongability in the left-right direction in FIG. 6C.

The distance (groove width) between adjoining straight line shapes presented in Table 2 was set based on distance (groove width) in print image data. The results are presented in Table 2.

TABLE 2

|  | Ex. 3 | Ex. 4 | Ex. 5 | Comp. Ex. 1 | Comp. Ex. 2 |
| --- | --- | --- | --- | --- | --- |
| Elongability | A | B | B | C | A |
| Elongability in Y direction | C | C | B | C | A |
| Density | B | A | B | A | C |
| Area ratio of laminated regions | 70 percent | 90 percent | 70 percent | 100 percent | 0 percent |
| Distance (groove width) between adjoining straight line shapes | 20 μm | 10 μm | 20 μm | — | — |

<Relationship between Area Ratio of Laminated Regions and Elongability>

Figure 9:
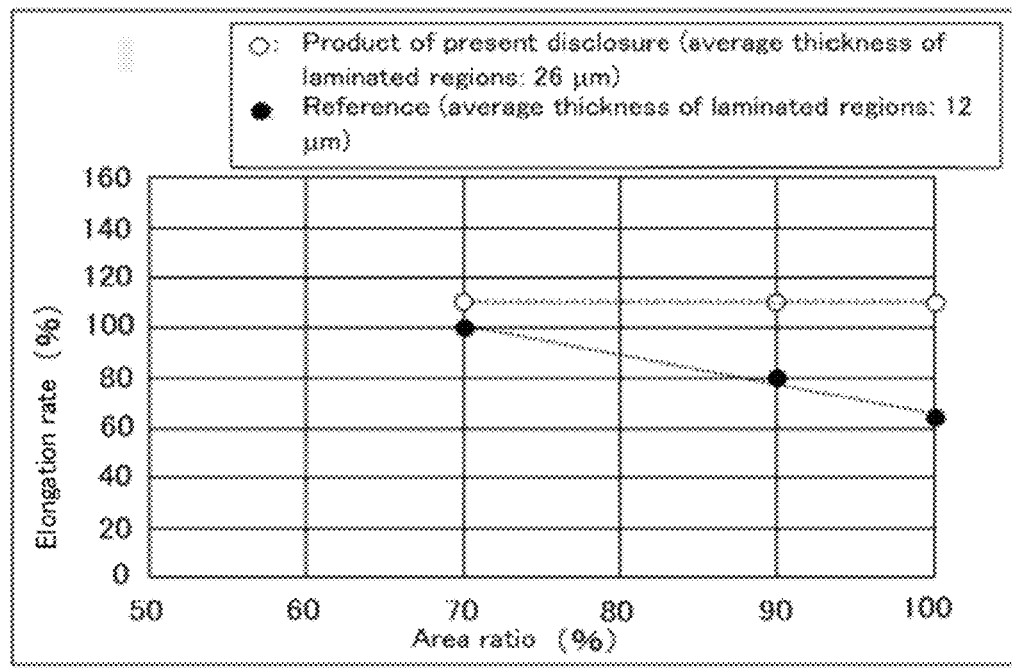
FIG. 9 is a graph plotting a relationship between area ratio of laminated regions of a cured product and elongation rate of the cured product.

FIG. 9 is a graph plotting a relationship between area ratio of laminated regions and elongability (in X direction), where all laminated regions had an average thickness of 26 μm.

For reference, FIG. 9 also plots a thin film of which laminated to regions had an average thickness of 12 μm. Both of the films always had the same area ratio of laminated regions.

From the result of FIG. 9, it was revealed that the elongation rate of the cured film was almost the same as the elongation rate of the thin film for reference when the area ratio of laminated regions was 70 percent, but that the density of the cured film was lower than the density of a solid cured film because the region with a small thickness occupied a large area of the cured film.

On the other hand, it was revealed that the elongation rate obtained when the area ratio of laminated regions was 90 percent was slightly lower than the elongation rate obtained when the area ratio of laminated regions was 70 percent, but that the density was almost the same as the density of a solid cured film.

Aspects of the present invention are as follows, for example.
<1> An image forming method including
an image forming step of discharging liquid droplets of an active-energy-ray-curable ink onto a base to form a liquid-droplet film and irradiating the liquid-droplet film with an active energy ray to form a cured film, to form a laminated cured product in which the cured film is laminated on the base,
wherein an elongation rate of the laminated cured product obtained according to a formula described below is 60 percent or greater, elongation rate=[(length after tensile test−length before tensile test)/(length before tensile test)]× 100 where the length before tensile test is a length of the laminated cured product obtained by laminating the cured film on the base to have an average thickness of 30 μm, and the length after tensile test is a length of the laminated cured product after elongated with a tensile tester at a tensile speed of 20 mm/minute at a temperature of 180 degrees C.
<2> The image forming method according to <1>, wherein the elongation rate of the laminated cured product obtained according to the formula is 100 percent or greater.
<3> The image forming method according to <1> or <2>, wherein the image forming step includes:
a first discharging process of discharging liquid droplets of the active-energy-ray-curable ink onto the base solidly to form a solid liquid-droplet film;
a first irradiating process of irradiating the solid liquid-droplet film with an active energy ray to form a solid cured film;
a second discharging process of discharging liquid droplets of the active-energy-ray-curable ink onto the solid cured film in a dot pattern to form liquid-droplet films in the dot pattern; and
a second irradiating process of irradiating the liquid-droplet films in the dot pattern with an active energy ray to form the dot pattern.
<4> The image forming method according to <3>, wherein patterns in the dot pattern are arranged independently from each other.
<5> The image forming method according to <3> or <4>, wherein the dot pattern is repetition of fixed patterns.
<6> The image forming method according to <5>, wherein the fixed patterns are circular patterns.
<7> The image forming method according to <5>, wherein the fixed patterns are polygonal patterns.
<8> The image forming method according to <3>, wherein the dot pattern is formed on the cured film as repetition of straight line shapes arranged at regular intervals.
<9> The image forming method according to <8>, wherein a distance between adjoining straight line shapes is 5 μm or greater but 20 μm or less.
<10> The image forming method according to <8> or <9>, wherein a direction in which the straight line shapes are repeated is at an arbitrary angle.

<11> The image forming method according to <8> or <9>, wherein a direction in which the straight line shapes are repeated is parallel with a longer direction of the base.

<12> The image forming method according to <8> or <9>, wherein a direction in which the straight line shapes are repeated is parallel with a shorter direction of the base.

<13> The image forming method according to any one of <3> to <12>, wherein (A/B)×100, which is an area ratio of an area A of the dot pattern to an area B of the cured film, is 70 percent or greater.

<14> The image forming method according to any one of <3> to <13>, wherein (A/B)×100, which is the area ratio of the area A of the dot pattern to the area B of the cured film, is 90 percent or greater.

<15> The image forming method according to any one of <3> to <14>, wherein the active-energy-ray-curable ink used in the first discharging process and the active-energy-ray-curable ink used in the second discharging process are two kinds of inks of which cured films are different in hardness.

<16> The image forming method according to <15>, wherein a cured film of the active-energy-ray-curable ink used in the second discharging process is higher in hardness than a cured film of the active-energy-ray-curable ink used in the first discharging process.

<17> The image forming method according to any one of <3> to <16>, wherein the active-energy-ray-curable ink used in the second discharging process contains diethylene glycol dimethacrylate and at least any one of caprolactone-modified dipentaerythritol hexaacrylate and ethylene oxide-modified trimethylolpropane trimethacrylate, and is free of a diluent solvent.

<18> The image forming method according to <17>, wherein a content of the diethylene glycol dimethacrylate is 10 percent by mass or greater but 95 percent by mass or less of a total amount of monomer components, and wherein a content of the at least any one of caprolactone-modified dipentaerythritol hexaacrylate and ethylene oxide-modified trimethylolpropane trimethacrylate is 5 percent by mass or greater but 90 percent by mass or less of the total amount of the monomer components.

19> An image forming apparatus including an image forming unit configured to discharge liquid droplets of an active-energy-ray-curable ink onto a base to form a liquid-droplet film and irradiate the liquid-droplet film with an active energy ray to form a cured film, to form a laminated cured product in which the cured film is laminated on the base, wherein an elongation rate of the laminated cured product obtained according to a formula described below is 60 percent or greater, elongation rate=[(length after tensile test−length before tensile test)/(length before tensile test)]× 100 where the length before tensile test is a length of the laminated cured product obtained by laminating the cured film on the base to have an average thickness of 30 μm, and the length after tensile test is a length of the laminated cured product after elongated with a tensile tester at a tensile speed of 20 mm/minute at a temperature of 180 degrees C.

<20> The image forming apparatus according to <19>, wherein the elongation rate of the laminated cured product obtained according to the formula is 100 percent or greater.

<21> The image forming apparatus according to <19> or <20>, wherein the image forming unit includes:
a first discharging member configured to discharge liquid droplets of the active-energy-ray-curable ink onto the base solidly to form a solid liquid-droplet film;
first irradiating member configured to irradiate the solid liquid-droplet film with an active energy ray to form a solid cured film;
a second discharging member configured to discharge liquid droplets of the active-energy-ray-curable ink onto the solid cured film in a dot pattern to form liquid-droplet films in the dot pattern; and
a second irradiating member configured to irradiate the liquid-droplet films in the dot pattern with an active energy ray to form the dot pattern, and
wherein patterns in the dot pattern are arranged independently from each other.

<22> The image forming apparatus according to <19> or <20>, wherein the image forming unit includes:
a first discharging member configured to discharge liquid droplets of the active-energy-ray-curable ink onto the base solidly to form a solid liquid-droplet film;
a first irradiating member configured to irradiate the solid liquid-droplet film with an active energy ray to form a solid cured film;
a second discharging member configured to discharge liquid droplets of the active-energy-ray-curable ink onto the solid cured film in a dot pattern to form liquid-droplet films in the dot pattern; and
a second irradiating member configured to irradiate the liquid-droplet films in the dot pattern with an active energy ray to form the dot pattern, and
wherein the dot pattern is formed on the cured film as repetition of straight line shapes arranged at regular intervals.

<23> The image forming apparatus according to <22>, wherein a distance between adjoining straight line shapes is 5 μm or greater but 20 μm or less.

<24> A laminated cured product, wherein the laminated cured product is formed by the image forming method according to any one of <1> to <18>.

The image forming method according to any one of <1> to <18>, the image forming apparatus according to any one of <19> to <23>, and the laminated cured product according to <24> can solve the various problems in the related art and achieve the object of the present disclosure.

What is claimed is:

1. An image forming method comprising:
discharging liquid droplets of a first active-energy-ray-curable ink onto a base to form a solid liquid-droplet film in which the liquid droplets of the first active-energy-ray-curable ink are applied with no gap;
irradiating the solid liquid-droplet film with a first active energy ray to form a solid cured film;
discharging liquid droplets of a second active-energy-ray-curable ink onto the solid cured film in a dot pattern in which dots in the dot pattern are separated from each other to form liquid-droplet films in the dot pattern; and
irradiating the liquid-droplet films in the dot pattern with a second active energy ray to form cured films in the dot pattern such that a laminated cured product in which the solid cured film and the cured films in the dot pattern are laminated on the base is formed,
wherein an elongation rate of the laminated cured product obtained according to a formula:

elongation rate=[(length after tensile test−length before tensile test)/(length before tensile test)]× 100, is 60 percent or greater,
where the length before tensile test is a length of the laminated cured product obtained by laminating the cured film on the base to have an average thickness of 30 μm, and the length after tensile test is a length of the laminated cured product after elongated with a tensile tester at a tensile speed of 20 mm/minute at a temperature of 180 degrees C.

2. The image forming method according to claim 1, wherein the dot pattern comprises repetition of fixed patterns.

3. The image forming method according to claim 2, wherein the fixed patterns comprise circular patterns.

4. The image forming method according to claim 2, wherein the fixed patterns comprise polygonal patterns.

5. The image forming method according to claim 1, wherein the dot pattern is formed on the solid cured film as repetition of straight line shapes arranged at regular intervals.

6. The image forming method according to claim 5, wherein a distance between adjoining straight line shapes is 5 μm or greater but 20 μm or less.

7. The image forming method according to claim 5, wherein a direction in which the straight line shapes are repeated is at an arbitrary angle.

8. The image forming method according to claim 5, wherein a direction in which the straight line shapes are repeated is parallel with a longer direction of the base.

9. The image forming method according to claim 5, wherein a direction in which the straight line shapes are repeated is parallel with a shorter direction of the base.

10. The image forming method according to claim 1, wherein (A/B)×100, which is an area ratio of an area A of the dot pattern to an area B of the solid cured film, is 70 percent or greater.

11. The image forming method according to claim 1, wherein the first active-energy-ray-curable ink and the second active-energy-ray-curable ink are two kinds of inks of which cured films are different in hardness.

12. The image forming method according to claim 11, wherein a cured film of the second active-energy-ray-curable ink is higher in hardness than a cured film of the first active-energy-ray-curable ink.

13. The image forming method according to claim 1, wherein the second active-energy-ray-curable ink used comprises diethylene glycol dimethacrylate and at least any one of caprolactone-modified dipentaerythritol hexaacrylate and ethylene oxide-modified trimethylolpropane trimethacrylate, and is free of a diluent solvent.

14. The image forming method according to claim 13, wherein a content of the diethylene glycol dimethacrylate is 10 percent by mass or greater and 95 percent by mass or less of a total amount of monomer components, and wherein a content of the at least any one of caprolactone-modified dipentaerythritol hexaacrylate and ethylene oxide-modified trimethylolpropane trimethacrylate is 5 percent by mass or greater and 90 percent by mass or less of the total amount of the monomer components.

* * * * *